United States Patent
Livingston

[11] Patent Number: 5,841,125
[45] Date of Patent: Nov. 24, 1998

[54] HIGH ENERGY LASER FOCAL SENSOR (HELFS)

[75] Inventor: Peter M. Livingston, Palos Verdes, Calif.

[73] Assignee: TRW Inc., Redondo Beach, Calif.

[21] Appl. No.: 870,901

[22] Filed: Jun. 6, 1997

[51] Int. Cl.⁶ .......................................................... G01J 1/20
[52] U.S. Cl. ........................ 250/201.9; 356/353; 372/29
[58] Field of Search ........................ 250/201.9; 356/345, 356/353, 354, 359, 360, 363; 372/29, 32; 359/845–849

[56] References Cited

U.S. PATENT DOCUMENTS

| | | |
|---|---|---|
| 3,877,813 | 4/1975 | Hayes et al. . |
| 4,477,720 | 10/1984 | Pearson . |
| 4,682,025 | 7/1987 | Livingston et al. . |
| 4,748,321 | 5/1988 | Ishida et al. . |
| 4,847,477 | 7/1989 | Smith . |
| 4,865,454 | 9/1989 | Lazzarini et al. . |
| 4,938,596 | 7/1990 | Gauthier et al. . |
| 4,990,762 | 2/1991 | Taylor . |
| 4,996,412 | 2/1991 | Anafi et al. . |
| 5,026,977 | 6/1991 | Hubbard, Jr. . |
| 5,127,731 | 7/1992 | DeGroot . |
| 5,166,508 | 11/1992 | Davis et al. . |
| 5,325,177 | 6/1994 | Peterson . |
| 5,367,375 | 11/1994 | Siebert . |
| 5,398,130 | 3/1995 | Redman . |
| 5,469,259 | 11/1995 | Golby et al. . |
| 5,493,398 | 2/1996 | Pfister . |
| 5,528,369 | 6/1996 | Starkey . |

*Primary Examiner*—Stephone Allen
*Attorney, Agent, or Firm*—Michael S. Yatsko

[57] ABSTRACT

A sensor having an interferometer, and a corresponding method, for use in the sensing of focal shifts in high energy laser beams are provided. The interferometer includes optical elements for generating a reference beam with a known wavefront phase curvature. In a preferred form of the invention, the reference beam is dithered and recombined with a sample beam, to produce a time-varying interference pattern indicative of the focal shift in the high energy laser beam. The interference pattern is focused by a lens onto a detector that produces electrical signals indicative of the detected interference pattern. The electrical signals are synchronously detected to remove the dither-frequency component, integrated, and amplified to generate a focal shift correction signal. The focal shift correction signal is then applied to an axially adjustable lens positioned to effect phase curvature changes in the reference beam wavefront to match those of the sample beam. The focal shift correction signals generated by the sensor are indicative of the high energy laser beam focal shift, and may be used for purposes of correcting these focal shifts.

32 Claims, 2 Drawing Sheets

HIGH ENERGY LASER FOCAL SENSOR (HELFS)

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to active optical systems, and more particularly, to interferometric sensors used in the measurement of focal shifts resulting from high power optical train heat and consequent high power beam wavefront distortion. The term "active optics" applies to optical components whose characteristics are adjusted during actual operation to control optical wavefronts. The term "optical ray" represents the direction of propagation of radiation and a "wavefront" is a three-dimensional surface of constant optical path length, orthogonal to a family of rays emanating from a source of radiation. To form an image of a point source of radiation, all rays in the family must have the same optical path length. In a medium of constant refractive index, this is achieved by generating a spherical wavefront, or if the point source is located at infinity, a planar wavefront. Although the geometric concepts of optical rays and wavefronts have no real physical existence, they are invaluable in the design and understanding of optical systems, and will be used in this specification.

In high power, or high energy laser beam applications, the terminology is interchangeable, laser beam absorption by optical elements with subsequent distortion may cause the high power beam's wavefront to distort primarily with a shift in focus. This focal shift can be substantial, and without a means for detecting and correcting this focal shift, the utility of the laser device may be seriously impaired. High energy laser optical systems have an energy output of about 1 million watts, are of relatively recent origin, and are not yet widely used in industrial applications. Consequently, the prior art has not directly addressed the problem of high energy laser beam focal shifts. Potential industrial applications include laser welding and cutting operations commonly employed in a variety of industries, ranging from auto production, the garment and microelectronics industries, and other precision laser welding and fabrication industries.

A focus detection device with wavefront aberration correction utilizing electrical calculation is disclosed in U.S. Pat. No. 4,748,321. This device uses complex electronic numerical computation to correct wavefront aberration and is unnecessarily complex for the unitary task of sensing focal shift. In addition an interferometric system coupled to a detector to compensate for wavefront aberration is disclosed in U.S. Pat. No. 4,682,025. However, these devices use complex detector arrays and multiple flexible mirror elements that again are unnecessarily complex for the task of sensing only the focal shift in high energy laser beams. Insofar as can be determined, no known system incorporates all of the features and advantages of the present invention.

Heterodyne interferometry is a technique used in some known systems. In this technique, the phase angle differences measured at a wavefront are carried by a high-frequency "dithering" signal superimposed on the system. The phase angle differences are then extracted in a synchronous detection step. The principal advantage of heterodyne interferometry is that it is highly insensitive to noise signals that would otherwise distort the accuracy of the phase angle measurements. A paper by N. A. Massie et al. entitled "Flow Field Testing with 64 Parallel Channel Heterodyne Interferometer," Proc. of SPIE-The International Society for Optical Engineering, Vol. 351, Wavefront Sensing, pp. 141–47, August 1982, and other papers cited within it, disclose one version of a device referred to as a heterodyne interferometer. However, other beam systems do not incorporate this technique into an interferometric sensor of simple design.

In spite of these developments, there is still a need for a fast, simple, and reliable technique for sensing and measuring the focal shift of a high energy laser beam. Ideally, the focal shift sensor will be a simple instrument with minimal moving parts, be based upon reliable and proven technology, and be of a rugged and robust design that permits fast and reliable measurements. Moreover, the high energy laser focal sensor should be less complex than other known interferometric systems and should be capable of providing a measure of focal shift without complex numerical computation. The present invention fulfills these needs and provides additional advantages over known devices.

BRIEF SUMMARY OF THE INVENTION

The present invention in its broadest sense provides a self-contained focal sensor capable of providing focal shift correction signals for a high energy laser beam, i.e., a laser beam with over 1 million watts of output power. However, as made clear in the discussion below, the present invention is not limited to laser beams with output power in the range of 1 million watts. Mirrors and lenses distort in proportion to the irradiance (watts/cm$^2$), not power (watts) directed to them. Therefore, smaller lasers that use small optics may have a significant distortion problem. This is because the irradiance values in the optical train may be large. Conversely, million-watt lasers with huge optics may have no distortion problem at all. However, if one desires a million watt laser with optics a few tens (10s) of centimeters in diameter, then element distortion may be a serious problem. Since all practical applications drive optical elements to relatively small sizes, focus control becomes essential.

Briefly, and in general terms, the apparatus of the invention comprises means for splitting an input beam into a reference-arm beam and a sample beam, means for generating a reference beam having a uniform phase surface from the reference-arm beam, means for recombining the sample beam and the reference beam to produce an interference pattern, and means for focusing the interference pattern on a detector.

The invention also includes tilt correction means for centering the input beam sent into the interferometer, means for modulating the reference beam with a high-frequency dither signal, detection means positioned to provide an electrical signal indicative of the intensity of the interference pattern, and an is electrical circuit connected to the detection means for generating a focal shift correction signal. The tilt-correcting system comprises a steering mirror, a beam splitter pick-off and a quad-cell detector. The steering mirror is a reflective movable mirror that can be continuously adjusted to alter the tilt of the input beam, while the semi-reflective beam splitter pick-off directs a portion of the input beam from the steering mirror toward the quad-cell detector. The quad-cell detector generates a signal proportional to the amount of light differentially incident on the quad-cell detector surface, and uses this signal to operate the steering mirror to null the signal.

The electrical circuit includes a transimpedance amplifier, synchronous detector means for removing dither-frequency components, integration means to provide an error signal representative of the focal shift in the input high energy laser beam, a driving amplifier that outputs a focal shift correction signal, and means for coupling the focal shift correction signal to an axially adjustable lens used to effect a change in phase curvature of the reference wavefront beam. The adjustable lens is automatically adjusted through the servo-loop electrical circuit to change the phase curvature of the reference beam wavefront to match that of the sample beam. Since the device of the invention neither requires complex numerical computations to sense the beam focal shift, nor employs numerous movable components such as a detector array or multiple flexible mirror or lens elements, it is a less expensive, simpler, and therefore more robust design.

In terms of a method for sensing a high energy laser beam focal shift, the invention comprises the initial step of correcting any input beam tilt, splitting the input beam into a reference-arm beam and a sample beam, generating a reference beam from the reference-arm beam, and combining the sample beam and the reference beam to produce an interference pattern that is subsequently focused onto a detector by a lens. The sample beam is directed to a reflecting mirror located in one leg of the Michelson-type interferometer and can be directed through an attenuating filter if photon attenuation is necessary. In addition, the invention comprises the steps of modulating the reference signal with a high-frequency dither signal to create a time varying signal over the detector surface. The detector then generates a sinusoidal electrical signal in response to the time varying signal.

The remaining steps of the method involve synchronous detection of the sinusoidal electrical signals of the detector that demodulates by removing dither-frequency components, integration of the detected signals to generate a focal shift correction signal as the time integral of the demodulated sinusoidal electrical signal, wherein the focal shift correction signal is representative of the beam focal shift, and coupling of the focal shift correction signal to an axially adjustable lens, whereby the adjustable lens is automatically adjusted to change the phase curvature of the reference beam wavefront to match that of the sampled beam. The focal shift correction signal may be used downstream of the beam splitter to eliminate or compensate for the focal shift of the high energy laser beam.

It will be appreciated from the foregoing that the present invention represents a significant advance in the field of active optical systems. In particular, the invention provides a tilt corrected heterodyne interferometer of simple and reliable construction in which an input beam is sampled and compared with a reference beam. The reference beam is then adjusted using an axially adjustable lens to provide a phase curvature matching that of the sample beam. The axially adjustable lens is a distinct advantage of the invention. The signal resulting from the reference beam adjustment may then be used to correct for any focal shift in the high energy laser beam. Other aspects and advantages of the invention will become apparent from the following more detailed description, taken in conjunction with the accompanying drawings.

DETAILED DESCRIPTION OF THE INVENTION

Figure 1:
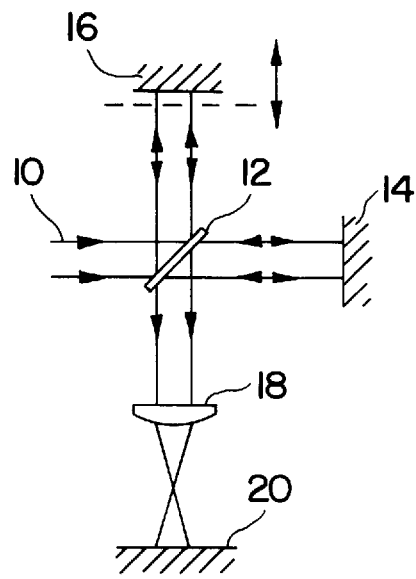
FIG. 1 is a schematic view illustrating the principle of a Michelson interferometer.

As shown in the drawings for purposes of illustration, the present invention is concerned with use of an active optical system for sensing high energy laser beam focal shifts. Focal shift sensing has in the past relied principally on wavefront reconstruction techniques. These techniques require complex digital numerical computations and/or complex optical components, such as flexible mirrors under servo-loop control. These techniques, although capable of sensing focal shifts in high energy laser beam applications, require complex and numerous components and control mechanisms, making them unnecessarily expensive, cumbersome and unreliable. The present invention uses a much simpler robust design that provides fast and reliable measurements of focal shift.

In accordance with the invention, focal shift sensing is performed rapidly and simply by means of a focal shift sensor comprising an interferometer of the Michelson type. The interferometer is controlled automatically in such a manner as to vary the phase curvature of the reference beam to correspond with that of the sample beam. The electrical control signals employed to control the interferometer are indicative of the focal shift of the sample input beam, and may be used to correct the focal shift of a high energy laser beam.

By way of background, a Michelson interferometer is shown in FIG. 1. An input beam, indicated by reference numeral 10, impinges on a semi-reflective beam splitter 12. One portion of the input beam passes through the beam splitter 12 to a plane reference mirror 14, while the remaining portion is reflected through an angle of 90° to a movable plane mirror 16. Some of the light reflected from the reference mirror 14 is again reflected at the beam splitter 12, and passes through a field lens 18 and onto an observation plane 20. Similarly, some of the light reflected from the movable mirror 16 passes through the beam splitter 12, after which it combines with light from reference mirror 14, and passes through the field lens 18 and onto the observation plane 20. The two beams of light arriving at the observation plane 20 have traversed different optical paths, and in general will have a different relative phase. In the original Michelson interferometer, the mirror 16 could be moved by means of a micrometer screw and the resulting interference fringes in the observation plane 20 used to adjust the optical path difference between the arms to zero (white light source) or a multiple of this wavelength (coherent source).

Figure 2:
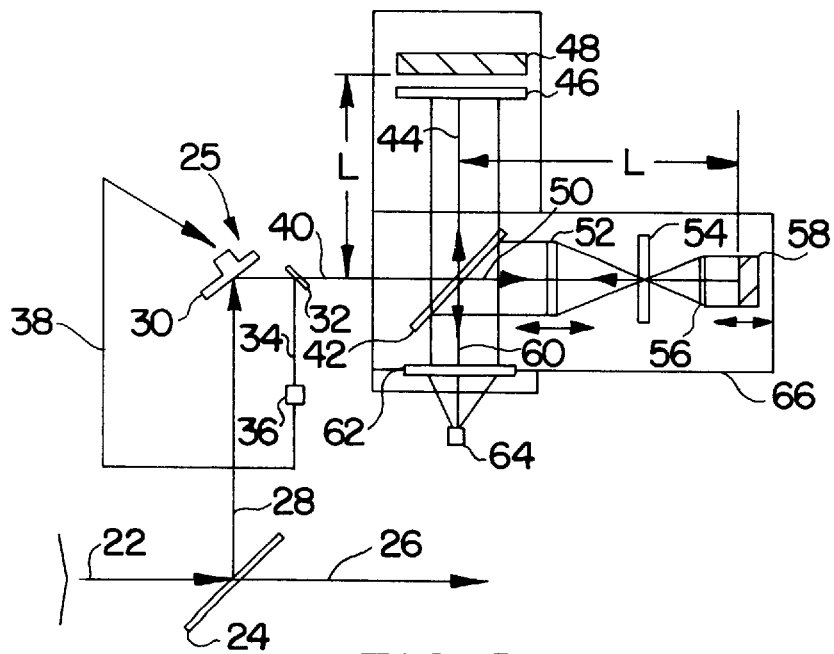
FIG. 2 is a schematic view of a high energy laser focal sensor in accordance with the invention.

The interferometer of the present invention makes use of the Michelson principle in a novel structure shown in FIG. 2. The present invention uses a tilt-correcting system indicated generally at 25 to ensure the input beam sent into the interferometer is centered. The tilt-correcting system 25 comprises a steering mirror 30, a beam-splitter pick-off 32, and a quad-cell detector 36. An interferometer input beam 40 impinges on a 50-50 beam splitter 42 at a 45° angle, dividing the beam into a sample beam 44 and a reference-arm beam 50. The reference-arm beam 50 is focused by a lens 52 through a pinhole spatial filter 54 and recollimated by a lens 56 onto a mirror 58. Light reflected from the mirror 58 is focused by the lens 56 through the pinhole spatial filter 54 and is recollimated by the lens 52 onto the 50-50 beam splitter 42. Light reflected back through the spatial filter 54 and recollimated onto the 50-50 beam splitter 42 has a uniform phase surface created by the double passage through the spatial filter 54 and appears to emanate from a point source located at an infinite distance. This reflected beam constitutes the reference beam 50, has a near-planar wavefront, and is at least partially reflected by the 50-50 beam splitter 42 through a 90° angle toward a detector 64.

In the other leg of the interferometer, the sample beam 44 can pass through an attenuating filter 46 and onto a plane mirror 48. The sample beam 44 is then reflected back through the attenuating filter 46 and toward the 50-50 beam splitter 42, which transmits a substantial portion of this beam for recombination with the reference beam. The recombined sample beam 44 and reference beam 50 impinge on a lens 62, where an interference pattern is produced. The sample beam 44 and reference beam 50 are focused by the lens 62 onto the detector 64. The detector 64 is a photoelectric transducer that produces a corresponding electrical signal on an output line 68 (see FIG. 3), which is then coupled to an electronics module that computes a focal shift correction signal representative of the input beam focal shift, and transmits this focal shift correction signal over a line 84 (see FIG.3) to the lens 52 which is axially adjustable.

The steering mirror 30 of the tilt-correcting system 25 is a reflective movable mirror that can be continuously adjusted to alter the tilt of the interferometer input beam 40 sent to the interferometer, while the semi-reflective beam splitter pick-off 32 directs a portion of a reflected input beam 28 from the steering mirror 30 toward the quad-cell detector 36. The beam splitter pick-off 32 generates a tilt sample beam 34 which is used to determine if the incident wavefront is tilted. The tilt sample beam 34 is directed toward the quad-cell detector 36. The quad-cell detector 36 is a standard pie-shaped detector capable of detecting incident light and producing a differential detector signal 38 proportional to the amount of light differentially incident on the detector surface 64. If the wavefront of reflected input beam 28 is tilted, the quad-cell 36 detects an imbalance between opposite detector elements of the quad-cell 36 and generates the differential detector signal 38 used to operate the steering mirror 30 to null the differential detector signal 38. The differential detector signal 38 generated by the quad-cell system 36 of the invention may be used to infer the degree of wavefront tilt of the reflected input beam 28, which can then be corrected.

The axially adjustable lens 52 is moved to alter the phase curvature of the reference beam 50 to match that of the sample beam 44. In one embodiment, the lens 52 is axially adjusted by a worm gear. Therefore, the detector electrical signals on line 68 (see FIG. 3) are indicative of the focal shift of input beam 22. The instrument shown in FIG. 2 functions as a stand-alone interferometric sensor, providing focal shift correction signals on line 84 (see FIG. 3) indicative of the focal shift of the input beam 22. The interferometer shown in FIG. 2 can be effectively used in a high energy laser beam apparatus for actively compensating for focal shifts.

A further aspect of the interferometer of FIG. 2 will now be described. The mirror 58 used in generating the reference beam 50 is also axially movable. A phase dither signal derived from a generator 74 is applied over line 86 to oscillate the mirror 58 along its optical axis by means of an appropriate piezoelectric transducer (see FIG. 3). Since the dither frequency is typically selected to avoid 1/f noise, the dither frequency is about 10 KHz. This is the heterodyne aspect of the structure. Because of the dithering of the mirror 58, the reference beam 50 contains frequency components representative of the sum of and the difference between the input beam frequency and the dither frequency.

As will be shortly described with reference to FIG. 3, the dither component is removed in an electronics module 90 by synchronous detection using an electrical dither signal 76 transmitted to the module 90 from the generator 74. The principal advantage of heterodyne operation of the interferometer is that the focal shift signals are effectively modulated onto a dither-frequency carrier, and the system is inherently insensitive to noise.

Figure 3:
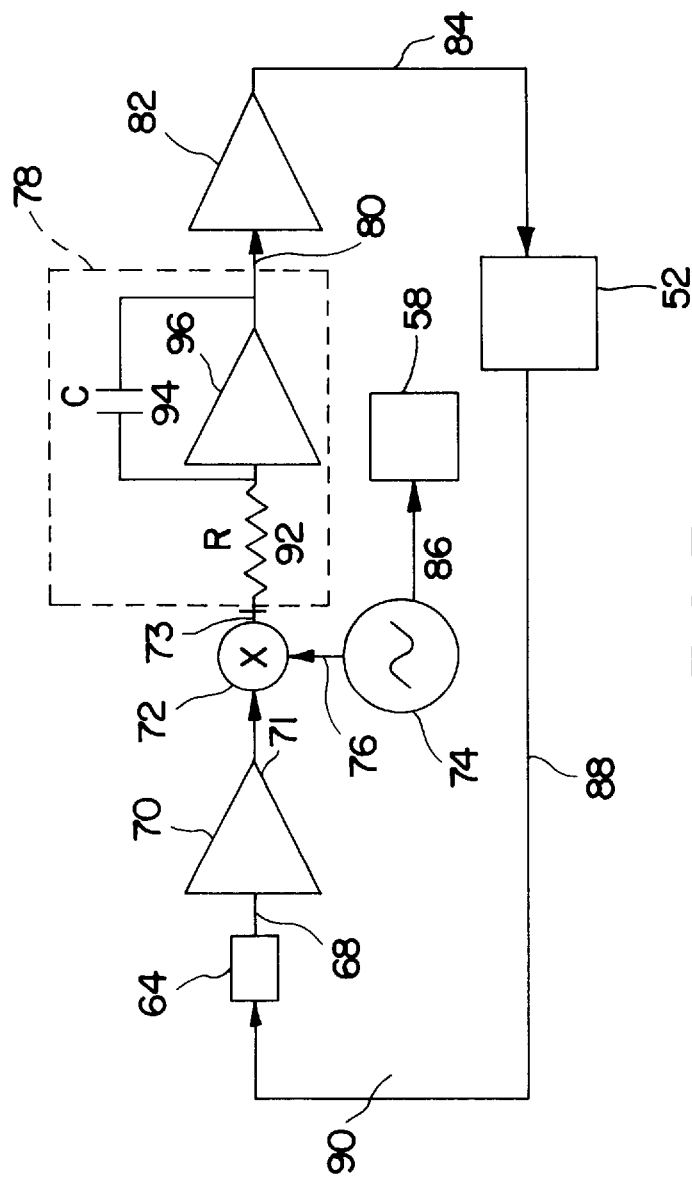
FIG. 3 is a schematic diagram of an electrooptical servo circuit used in the high energy laser focal sensor of FIG. 2.

FIG. 3 shows the components of the electronics module 90. The components include a transimpedance amplifier 70, a synchronous detector 72, an integrator 78, and a driving amplifier 82 to drive the axially adjustable lens 52. Electrical signals obtained from the detector 68 are first amplified in the transimpedance amplifier 70. The transimpedance amplifier 70 is a pre-amplifier of a type generally used with photodetectors for purposes of impedance matching and is used to prevent loading of the detector 64. After amplification, an electrical signal 71 obtained from the detector 68 is synchronously detected 72 and passed to an integrator 78. The integrator 78 is of a standard type and comprises a resistor 92, a capacitor 94 and an operational amplifier 96. Emerging from the integrator 78 on line 80 is an error signal that is amplified at the driving amplifier 82 to output a focal shift correction signal 84. The sign of the focal shift correction signal 84 determines the direction of travel, and its magnitude determines the rate of travel. In one embodiment, the focal shift correction signal 84 is coupled to an electrically driven worm gear used to drive the axially adjustable lens 52.

Measurement of the focal shift involves combining the amplified detector electrical signal 71 with a synchronous reference dither-frequency signal 76 to obtain a demodulated output signal on line 73 that is proportional to the difference between the reference beam 50 and sample beam 44 wavefront phase curvatures. The demodulated output signal 73 is then integrated to generate a focal shift correction signal wherein the focal shift correction signal is the time integral of the demodulated output signal 73. The dither-frequency signal generated at the oscillator 74 is also transmitted over line 86 to the mirror 58. The illustrated servo-loop circuit is a so-called nullseeking servo-loop. According to Eq. 6, the error characteristic nulls at Δf=0 with a sign corresponding to the sign of the focal length difference. It will rapidly lock the phases of the interfering sample beam 44 and reference beam 50 and generate a focal shift correction signal 84 that keeps the reference beam 50 locked in phase with the sample beam 44. The focal shift correction signal 84 is indicative of the focal shift of the input beam 22.

The focal shift correction signal can be analytically quantified by evaluating an error characteristic. Assume a sample wave $E_s$, and a reference wave $E_{ref}$ having the following form:

$$E_s = ae^{\frac{i\kappa\rho^2}{2f_1} - i\omega t} \quad (1)$$

$$E_{ref} = be^{\frac{i\kappa\rho^2}{2f_2} - i\omega t - i\eta\cos\theta}$$

$$E_{tot} = E_s + E_{ref}$$

Here a and b are complex constants, $f_1$, $f_2$ are the two focal lengths in question, and $\eta$, $\theta$ describe the extension of the high frequency dither mirror 58 and its frequency, expressed in angular form, i.e., the product of radian frequency times the time. At the beam splitter 42 the two fields combine as shown in equation (1). This sum field passes through the lens 62 and is imaged onto the detector 64. The far-field on the detector 64 is the Fourier transform of the fields filling the lens aperture 62. The transform is approximated by assuming that the diameter of lens 62 is many wavelengths by letting the radius of the lens 62 approach infinity, permitting analytic evaluation of the transforms. The key integral has the identity:

$$\int_0^\infty \rho d\rho J_o(\beta\rho) e^{i\alpha\rho^2} = \frac{1}{2\alpha} e^{\pm i\left(\frac{\pi}{2} - \frac{\beta^2}{4\alpha}\right)} \tag{2}$$

With this transform, the definition of the fields in equation 1, and the focal length $f_3$ of the lens 62, the irradiance in the detector plane 64 may be written as follows:

$$I(r,\theta) = \frac{1}{8\pi} \left(\frac{\epsilon}{\mu}\right)^{1/2} \left(|a|^2 + |b|^2 + ab^*e^{\left(\frac{-ikr^2 f_1}{2f_3^2} + \frac{ikr^2 f_2}{2f_3^2} + i\eta\cos\theta\right)} + a^*b e^{\left(\frac{ikr^2 f_1}{2f_3^2} - \frac{ikr^2 f_2}{2f_3^2} - i\eta\cos\theta\right)}\right) \tag{3}$$

$$= I_1(0) + I_2(0) + 2\sqrt{(I_1 I_2)} \cos\left[\frac{kr^2}{2f_3^2}(f_2 - f_1) + \eta\cos\theta + \phi\right]$$

Here $\phi$ is an arbitrary phase angle between the reference beam 50 and sample beam 44. The irradiance fills or overfills the detector aperture 64, having a diameter d. Therefore, the detector current, I, is the integral of I over the aperture area:

$$i(\theta) = \frac{\xi e\lambda}{hc} \frac{\pi d^2}{4} \left(I_1 + I_2 + 2\sqrt{(I_1 I_2)} \frac{4F^2\lambda}{\pi\Delta f} \left(\cos(\eta\cos\theta + \phi)\sin\left[\frac{\pi\Delta f}{4F^2\lambda}\right] - \sin(\eta\cos\theta + \phi)\left(1 - \cos\left[\frac{\pi\Delta f}{4F^2\lambda}\right]\right)\right)\right) \tag{4}$$

$$\Delta f = f_2 - f_1$$

$$F = \frac{f_3}{d}$$

Here $\xi$ is the detector quantum efficiency, h is Planck's constant, and $\lambda$ is the operating wavelength. An electrical current proportional to that in equation 4 is synchronously detected at 72 and integrated at 78. Mathematically, the dither generator output 76 multiplies the current shown in the above equation, and averages the result over a dither period:

$$V_e\left(\frac{\Delta f}{\lambda}\right) = \frac{1}{2\pi} \int_0^{2\pi} d\theta \cos\theta i(\theta) \tag{5}$$

$$= -\kappa f_3^2 J_1(\eta) \left[\frac{\lambda}{\Delta f} \sin\left(\frac{\pi\Delta f}{4F^2\lambda}\right)\sin\phi + \frac{\lambda}{\Delta f}\left(1 - \cos\left[\frac{\pi\Delta f}{4F^2\lambda}\right]\right)\cos\phi\right]$$

$$\kappa = (I_1 I_2)^{1/2} \frac{\xi e\lambda}{hc} \pi$$

Hence $V_e$ is the desired error voltage representative of the focal shift correction signal 84, apart from non-essential gain constant multipliers. The constant $\kappa$ collects all of the dimensional factors such as quantum efficiency, electron charge, Planck's constant, and so forth. It is observed that the first term in the brackets is an even function of $\Delta f/\lambda$ whereas the second is odd. In effect, a non-zero value of $\phi$ will 'bias-off' the zero crossing such that the servo will lock up at a fixed, but non-zero mean phase difference between the sample beam 44 and reference beam 50 wavefronts. This phase angle can be carefully tuned out in a properly constructed interferometer. Hence the appropriate final functional form for the error characteristic is:

$$V_e\left(\frac{\Delta f}{\lambda}\right) = -\kappa f_3^2 J_1(\eta)\left[\frac{\lambda}{\Delta f}\left(1 - \cos\left[\frac{\pi\Delta f}{4F^2\lambda}\right]\right)\right] \approx \tag{6}$$

$$-\kappa f_3^2 J_1(\eta) \frac{\pi^2}{32F^4} \frac{\Delta f}{\lambda} \text{ for } |\Delta f| \approx 0$$

It is clear that the error characteristic is proportional to the magnitude and sign of $\Delta f$ and the dither magnitude as well as the overall gain through the preamplifier 70, integrator 78, and driver amplifier 82. The error characteristic exits the driver amplifier 82 as a focal shift correction signal, wherein the focal shift correction signal is coupled to the axially adjustable lens 52 suitable for matching the phase curvature of the reference beam 50 to that of the sample beam 44.

While particular elements, embodiments and applications of the present invention have been shown and described, it will be understood, of course, that the invention is not limited thereto since modifications may be made by those skilled in the art, particularly in light of the foregoing teachings. The invention is therefore contemplated by the appended claims to cover such modifications as incorporate those features which come within the spirit and scope of the invention.

I claim:

1. A high energy laser focal sensor comprising:

tilt-correcting means for correcting the tilt of an input beam;

beam splitting means for splitting the input beam into a reference-arm beam and a sample beam;

means for generating a reference beam from the reference-arm beam;

means for modulating the reference beam with a high-frequency dither signal;

an axially adjustable lens means for effecting wavefront changes in the reference beam;

means for recombining the sample beam and the reference beam to produce an interference pattern;

detection means for generating electrical signals indicative of the interference pattern;

an electrical circuit connected to the detection means, the electrical circuit comprising synchronous detector means for removing dither-frequency components from the electrical signals, and means for providing a focal shift correction signal from the electrical signals; and means for coupling the focal shift correction signal to the axially adjustable lens means so that the adjustable lens means is automatically adjusted to match a phase curvature of the reference beam wavefront to that of the sample beam.

2. A high energy laser focal sensor as set forth in claim 1, wherein:

the tilt-correcting means includes a steering mirror reflecting the input beam toward a pick-off beam splitter;

the pick-off beam splitter directs a tilt sample beam toward a quad-cell detector having detector elements;

the quad-cell detector generates a differential detector signal in response to any imbalance between the detector elements; and the differential detector signal operates the steering mirror to null the differential detector signal.

3. A high energy laser focal sensor as set forth in claim 1, wherein:

the means for generating a reference beam comprises a mirror that reflects the reference beam back toward the beam splitting means;

the axially adjustable lens means is positioned to direct the reference beam back toward the beam splitting means; and the beam splitting means recombines the reference and sample beams.

4. A high energy laser focal sensor as set forth in claim 3, wherein the means for modulating the reference beam with a high-frequency dither signal comprises:

a dither frequency signal generator; and transducer means coupled to the dither frequency signal generator for oscillating the mirror used to generate the reference beam.

5. A high energy laser focal sensor for detecting focal shifts in an input beam, the sensor comprising:

tilt-correcting means for correcting the tilt of the input beam;

means for obtaining a sample beam from the input beam;

means for generating a reference beam from the input beam;

means for combining the sample beam with the reference beam to produce a corresponding interference pattern;

means for focusing the interference pattern on a detector, wherein said detector is positioned to sense the interference pattern and generates a corresponding electrical signal indicative of the interference pattern; and electrical circuit means for generating focal shift correction signals from the detector electrical signals, and coupling the focal shift correction signals to an axially adjustable lens, whereby the lens is automatically adjusted to change the phase curvature of the reference beam wavefront to match that of the sample beam, and the focal shift correction signals provide an indication of the degree of focal shift in the input beam.

6. A high energy laser focal sensor as set forth in claim 5, wherein:

the tilt-correcting means includes a steering mirror reflecting the input beam toward a pick-off beam splitter;

the pick-off beam splitter directs a tilt sample beam toward a quad-cell detector having detector elements;

the quad-cell detector generates a differential detector signal in response to any imbalance between the detector elements; and the differential detector signal operates the steering mirror to null the differential detector signal.

7. A high energy laser focal sensor as set forth in claim 5, wherein the means for generating a reference beam from the input beam comprises:

a beam splitter for obtaining a reference portion of the input beam;

a pinhole spatial filter arranged to receive the reference portion of the input beam focused by the axially adjustable lens;

a mirror for reflecting the reference portion of the beam back through the pinhole spatial filter so that the reference beam has a uniform phase surface.

8. A high energy laser focal sensor as set forth in claim 7, wherein:

the means for generating a reference beam further comprises a recollimating lens for recollimating the reference portion of the beam emerging from the pinhole spatial filter;

the axially adjustable lens functions as a recollimating lens; and the mirror for reflecting the reference portion of the beam is a plane mirror.

9. A high energy laser focal sensor as set forth in claim 8, further comprising:

a dither frequency generator and means for applying axial movement at the dither frequency to the mirror in the means for generating the reference beam; and the electrical circuit means includes synchronous detector means to demodulate the detector electrical signals, and integration means to generate the focal shift correction signals as the time integral of the demodulated detector electrical signals.

10. A high energy laser focal sensor as set forth in claim 5, further comprising:

means for heterodyning the reference beam at a dither frequency; and means within the electrical circuit means for synchronously detecting the detector electrical signals.

11. A high energy laser focal sensor, comprising:

tilt-connecting means for correcting the tilt of an input beam;

beam splitting means for splitting the input beam into a reference-arm beam and a sample beam;

means for generating a reference beam from the reference-arm beam, including a pinhole spatial filter, a recollimating lens, and a reference beam mirror for reflecting the reference beam back through the spatial filter to the beam splitting means;

a sample beam mirror positioned to reflect the sample beam back to the beam splitting means, the beam splitting means recombining the sample beam and the reference beam to produce an interference pattern;

means for oscillating the reference beam mirror to modulate the reference beam with a high-frequency dither signal;

detection means positioned to receive the recombined sample and reference beams, and to provide detector electrical signals indicative of the resulting interference pattern;

an electrical circuit connected to the detection means, wherein the electrical circuit includes synchronous detector means for removing dither-frequency components, and means for providing a focal shift correction signal from the electrical signals; and means for coupling the focal shift correction signal to an axially adjustable lens so that the adjustable lens is automatically adjusted to change the phase curvature of the reference beam wavefront to match that of the sample beam, the adjustable lens also functioning as a recollimating lens.

12. A high energy laser focal sensor as set forth in claim 11, wherein:

the tilt-correcting means includes a steering mirror that reflects the input beam toward a pick-off beam splitter;

the pick-off beam splitter directs a tilt sample beam toward a quad-cell detector having detector elements;

the quad-cell detector generates a differential detector signal in response to any imbalance between the detector elements; and the differential detector signal operates the steering mirror to null the differential detector signal.

13. A method for sensing a high energy laser beam focal shift comprising the steps of:

splitting an input beam into a reference-arm beam and a sample beam;

generating a reference beam from the reference-arm beam;

modulating the reference beam with a high-frequency dither signal;

combining the sample beam and the reference beam to produce an interference pattern;

focusing the interference pattern with a lens onto a detector and generating electrical signals indicative of the interference pattern;

synchronously detecting the detector electrical signals by removing dither-frequency components;

integrating the synchronously detected electrical signals to provide focal shift correction signals; and applying the focal shift correction signals to an axially adjustable lens so that the adjustable lens is automatically adjusted to change the phase curvature of the reference beam wavefront to match that of the sample beam.

14. A method as set forth in claim 13, further comprising the steps of:

correcting the input beam for tilt with a steering mirror, a pick-off beam splitter and a quad-cell detector;

the steering mirror reflecting the input beam toward the pick-off beam splitter;

the pick-off beam splitter directing a tilt-sample beam toward the quad-cell detector having detector elements;

the quad-cell detector generating a differential detector signal in response to any imbalance between the detector elements; and the differential detector signal operating the steering mirror to null the differential detector signal.

15. A method as set forth in claim 13, further comprising the steps of arranging the axially adjustable lens within an interferometric sensor; and providing a measure of the focal shift in the input beam using the focal shift correction signals.

16. A high energy laser focal sensor, comprising:

tilt-correcting means for correcting the tilt of an input beam;

means for generating a reference beam and a sample beam from an input beam;

means for modulating the reference beam with a high-frequency dither signal;

means for combining the reference and the sample beam to produce an interference pattern;

detection means positioned to provide electrical signals indicative of the interference pattern;

axially adjustable lens means for effecting wavefront changes in the reference beam; and an electrical circuit connected to the detection means to derive focal shift correction signals from the detector electrical signals, wherein the focal shift correction signals are coupled to the axially adjustable lens means, so that the adjustable lens means is automatically adjusted to change the phase curvature of the reference beam wavefront to match that of the sample beam, and whereby the focal shift correction signals coupled to the adjustable lens means are indicative of the focal shift of the input beam.

17. A high energy laser focal sensor as set forth in claim 16, wherein:

the tilt-correcting means includes a steering mirror reflecting the input beam toward a pick-off beam splitter;

the pick-off beam splitter directs a tilt sample beam toward a quad-cell detector having detector elements;

the quad-cell detector generates a differential detector signal in response to any imbalance between the detector elements; and the differential detector signal operates the steering mirror to null the differential detector signal.

18. A method of sensing a high energy laser beam focal shift, comprising the steps of:

deriving a sample beam and a reference beam from an input beam;

modulating the reference beam with a high-frequency dither signal;

combining the sample beam and the reference beam to produce an interference pattern;

detecting the interference pattern with a detector and generating electrical signals indicative of the interference pattern;

deriving focal shift correction signals from the detector electrical signals; and applying the focal shift correction signals to an axially adjustable lens, whereby the adjustable lens is automatically adjusted to change the phase curvature of the reference beam wavefront to match that of the sample beam, and whereby the focal shift correction signals are indicative of the degree of focal shift in the sample beam.

19. A method as set forth in claim 18, further comprising the steps of:

correcting the input beam for tilt with a steering mirror, a pick-off beam splitter and a quad-cell detector;

the steering mirror reflecting the input beam toward the pick-off beam splitter;

the pick-off beam splitter directing a tilt-sample beam toward the quad-cell detector having detector elements;

the quad-cell detector generating a differential detector signal in response to any imbalance between the detector elements; and the differential detector signal operating the steering mirror to null the differential detector signal.

20. A high energy laser focal sensor, comprising:

tilt-correcting means for correcting the tilt of an input beam;

beam splitting means for splitting the input beam into a reference-arm beam and a sample beam;

means for generating a reference beam from the reference-arm beam;

means for modulating the reference beam with an oscillatory dither signal;

means for recombining the sample beam and the reference beam to produce an interference pattern;

detection means positioned to provide electrical signals indicative of the interference pattern;

electrical circuitry connected the detection means, wherein the electrical circuitry includes synchronous detector means for removing dither-frequency components from the detector electrical signals, and means to provide a focal shift correction signal from the electrical signals;

axially adjustable lens positioned to effect wavefront changes in the reference beam; and means for coupling the focal shift correction signals to the adjustable lens means so that the adjustable lens is automatically adjusted to change the phase curvature of the reference beam wavefront to match that of the sample beam.

21. A high energy laser focal sensor as set forth in claim 20, wherein:

the tilt-correcting means includes a steering mirror reflecting the input beam toward a pick-off beam splitter;

the pick-off beam splitter directs a tilt sample beam toward a quad-cell detector having detector elements;

the quad-cell detector generates a differential detector signal in response to any imbalance between the detector elements; and the differential detector signal operates the steering mirror to null the differential detector signal.

22. A high energy laser focal sensor, as set forth in claim 20, wherein:

the axially adjustable lens means is positioned to direct the reference beam back to the beam splitting means and wherein the adjustable lens also functions as a recollimating lens;

the means for generating a reference beam includes a recollimating lens that directs the reference beam onto a mirror that reflects the reference beam back toward the beam splitting means; and the beam splitting means also functions as the means for recombining the reference and sample beams.

23. A high energy laser focal sensor, as set forth in claim 22, wherein the means for modulating the reference beam with an oscillatory dither signal further comprises:

a dither frequency signal generator; and transducer means coupled to the dither frequency signal generator for oscillating the mirror used to generate the reference beam.

24. A high energy laser focal sensor for detecting focal shifts in an input beam, the sensor comprising:

tilt-correcting means for correcting the tilt of the input beam;

means for obtaining a sample beam from the input beam;

means for generating a reference beam from the input beam;

means for combining the sample beam with the reference beam to produce an interference pattern;

a detector positioned to sense the interference pattern and generating corresponding electrical signals indicative of the interference pattern; and electrical circuit means for generating focal shift correction signals from the detector electrical signals, and coupling the focal shift correction signals to an axially adjustable lens so that the adjustable lens is automatically adjusted to change the phase curvature of the reference beam wavefront to match that of the sample beam, and the focal shift correction signals provide an indication of the focal shift in the input beam.

25. A high energy laser focal sensor as set forth in claim 24, wherein:

the tilt-correcting means includes a steering mirror reflecting the input beam toward a pick-off beam splitter;

the pick-off beam splitter directs a tilt sample beam toward a quad-cell detector having detector elements;

the quad-cell detector generates a differential detector signal in response to any imbalance between the detector elements; and the differential detector signal operates the steering mirror to null the differential detector signal.

26. A high energy laser focal sensor as set forth in claim 24, wherein the means for generating a reference beam from the input beam further comprises:

a beam splitter for obtaining a reference portion of the input beam;

a pinhole spatial filter through which the reference portion of the input beam is focused with the axially adjustable lens, wherein the adjustable lens also functions as a recollimating lens; and a mirror that reflects the reference portion of the input beam so that the reference beam has a uniform phase surface.

27. A high energy laser focal sensor as set forth in claim 26, wherein:

the mirror for reflecting the reference portion of the beam is a plane mirror; an the means for generating reference beam further includes a recollimating lens.

28. A high energy laser focal sensor as set forth in claim 26, further comprising:

a dither frequency generator and means for applying axial movement to the mirror in the means for generating the reference beam, at the dither frequency; and the electrical circuit means includes synchronous detector means to demodulate the detector electrical signals, and integration means to generate the focal shift correction signals as the time integral of the demodulated detector electrical signals.

29. A high energy laser focal sensor as set forth in claim 24, further comprising:

means for heterodyning the reference beam at a dither frequency; and means within the electrical circuit means for synchronously detecting the detector electrical signals.

30. A method of sensing an optical focal shift comprising the steps of:
  generating a sample beam from an input beam;
  generating a reference beam from the same input beam;
  modulating the reference beam with an oscillatory dither signal;
  combining the sample beam and the reference beam to produce an interference pattern;
  detecting the interference pattern with a detector and generating electrical signals indicative of the interference pattern;
  synchronously detecting phase difference signals in the detector electrical signals, by removing dither-frequency components;
  integrating the detected signals to provide a focal shift correction signal; and
  applying the focal shift correction signal to an axially adjustable lens so that the adjustable lens is automatically adjusted to change the phase curvature of the reference beam wavefront to match that of the sample beam.

31. A method as set forth in claim 30, further comprising the steps of:
  correcting the input beam for tilt with a steering mirror, a pick-off beam splitter and a quad-cell detector;
  the steering mirror reflecting the input beam toward the pick-off beam splitter;
  the pick-off beam splitter directing a tilt-sample beam toward the quad-cell detector having detector elements;
  the quad-cell detector generating a differential detector signal in response to any imbalance between the detector elements; and
  the differential detector signal operating the steering mirror to null the differential detector signal.

32. A method for sensing an optical focal shift, comprising the steps of:
  deriving a sample beam and a reference beam from an input beam;
  combining the sample beam and the reference beam to produce an interference pattern;
  modulating the reference beam with an oscillatory dither signal;
  focusing the interference pattern with a lens onto a detector and generating electrical signals indicative of the interference pattern;
  deriving focal shift correction signals from the electrical signals; and
  applying the focal shift correction signals to an axially adjustable lens so that the adjustable lens is automatically adjusted to change the phase curvature of the reference beam wavefront to match that of the sample beam, and whereby the focal shift correction signals are indicative of the degree of focal shift in the wavefront of the sample beam.

* * * * *